United States Patent [19]
Aihara et al.

[11] Patent Number: 4,721,976
[45] Date of Patent: Jan. 26, 1988

[54] AE LOCK DEVICE FOR CAMERA

[75] Inventors: Yoshihiko Aihara; Shuichi Kiyohara; Akira Yamada, all of Kanagawa, Japan

[73] Assignee: Canon Kabushiki Kaisha, Tokyo, Japan

[21] Appl. No.: 890,079

[22] Filed: Jul. 24, 1986

[51] Int. Cl.[4] ............................................. G03B 7/08
[52] U.S. Cl. .................................. 354/441; 354/429; 354/460; 354/484
[58] Field of Search ............... 354/431, 432, 433, 434, 354/441, 442, 446, 448, 460, 484, 486, 429

[56] References Cited

U.S. PATENT DOCUMENTS

| | | | |
|---|---|---|---|
| 3,836,921 | 9/1974 | Mori | 354/460 |
| 4,284,341 | 8/1981 | Yamada | 354/460 |
| 4,289,389 | 9/1981 | Kobori et al. | 354/460 |
| 4,302,083 | 11/1981 | Kawamura et al. | |
| 4,325,617 | 4/1982 | Sahara et al. | 354/433 |
| 4,435,057 | 3/1984 | Nakai et al. | 354/460 |
| 4,615,601 | 10/1986 | Okubo | 354/460 |
| 4,636,056 | 1/1987 | Kobayashi et al. | |

*Primary Examiner*—Russell E. Adams
*Attorney, Agent, or Firm*—Toren, McGeady & Associates

[57] ABSTRACT

The present invention relates to a so-called AE lock device for camera, and more particularly to such device in which as the object brightness is changing rapidly, when the stored value of brightness at the time of the AE lock is later found to give an improper exposure value, either photographer is warned of this, or the AE lock mode is cancelled automatically.

8 Claims, 6 Drawing Figures

AE LOCK DEVICE FOR CAMERA

BACKGROUND OF THE INVENTION

1. Field of the Invention

This invention relates to a camera having an AE lock function.

2. Description of the Related Art

It has been known in the art to provide cameras with an AE lock function. The camera of this kind is switched from the normal to the AE lock mode when a subject of principal photographic interest is put out of the center of the view field, so that a proper exposure is made to the subject. That is, as the central spot metering operates, the photographer first aligns the camera to the subject in order to measure its brightness and after the measured value of brightness is memorized, then changes the composition to a desired one with the subject out of the center of the view field before a shot is taken. Because the exposure is controlled in accordance with the memorized brightness, it is insured that a proper result for the subject is attained.

However, in photographic situations where the intensity of ambient light with which the subject was illuminated was rapidly changing, a problem arose that when the conventional camera was in AE lock mode, it was impossible to insure that the proper exposure was made to the subject because its brightness changed just before shooting. For example, a series of patches of clouds were moving at a fast speed across the sun, when the AE lock photography was performed. Under such a condition, there was produced a large difference between the brightnesses of the subject at the time of AE lock and, after the later readjustment of the composition, at the time of the shot, so that a large percentage of photographs taken were found to be unacceptable.

SUMMRY OF THE INVENTION

One aspect of the present invention is a camera having an AE lock function in which after the AE locking has been operated, when the object brightness changes beyond prescribed limits relative to the locked brightness, a warning signal is produced, or the AE lock mode is automatically reset to thereby eliminate the above-described problem.

Other objects of the invention will become apparent from the following description of an embodiment thereof by reference to the drawings.

DETAILED DESCRIPTION OF THE PREFERRED EMBODIMENT

Figure 1:
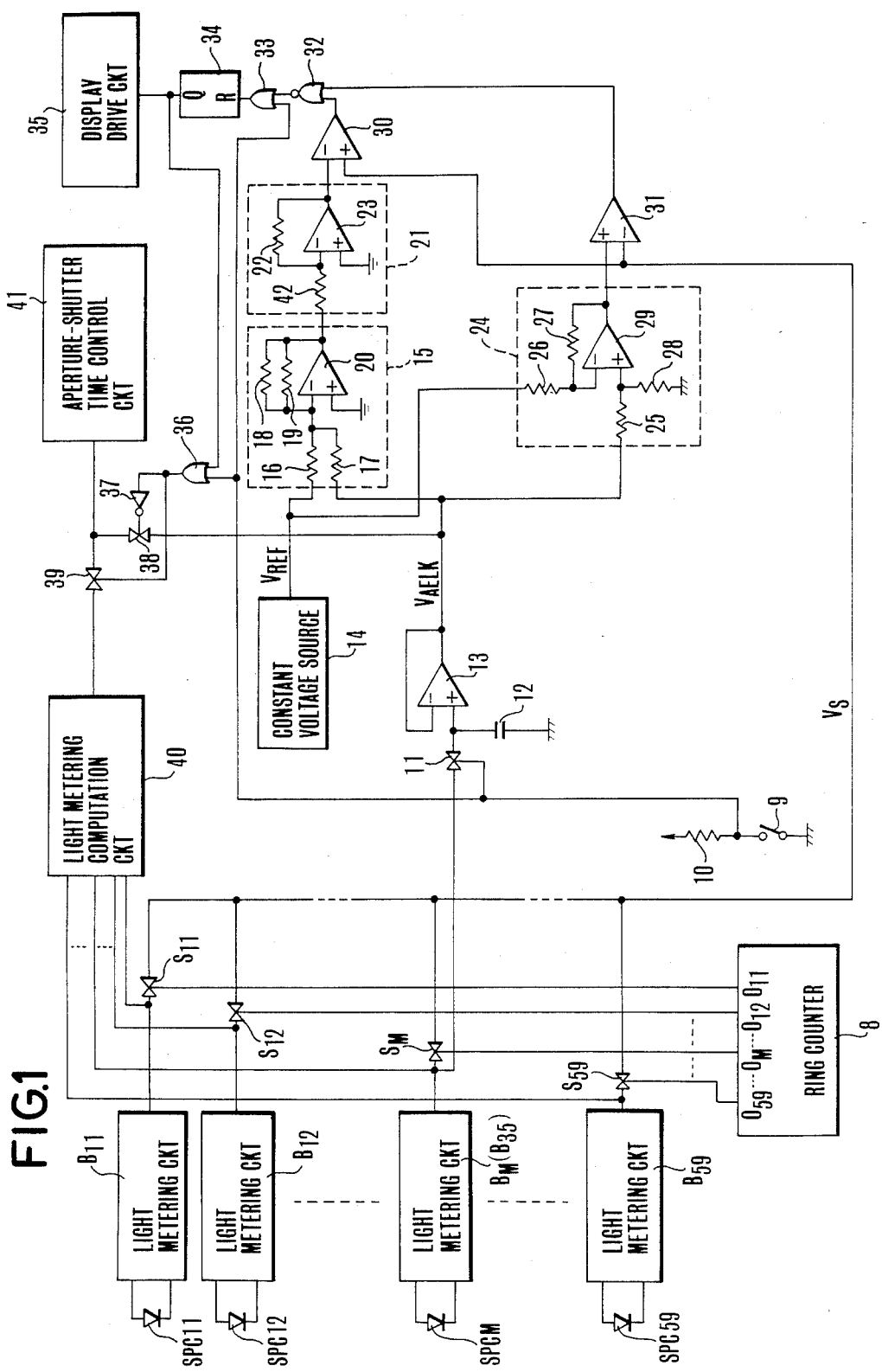
FIG. 1 is an electrical circuit diagram of an embodiment of the camera according to the present invention.

The present invention is next described in great detail in connection with an embodiment thereof illustrated in the drawings.

Figure 4:
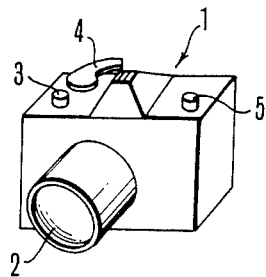
FIG. 4 is a perspective view of the outer appearance of the camera having the AE lock function with the circuit of FIG. 1.

Referring first to FIG. 4, a camera 1 capable of AE lock function has a photographic lens 2, a release button 3, a film winding lever 4, and an AE lock button 5.

Figure 5:
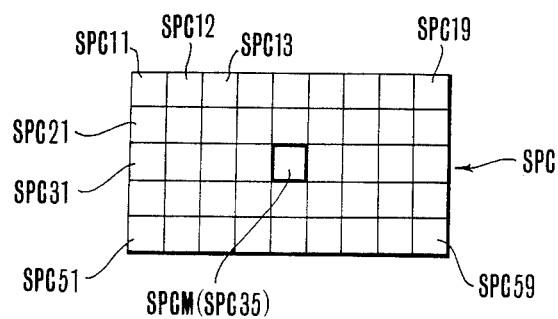
FIG. 5 is a plan view of a multiple segmented photo sensor.

In FIG. 5, the light receiving surface of a photosensor SPC is segmented into a matrix array of photosensitive elements in nine columns and five rows denoted by the characters SPCij where i denotes the row counting from the top and j the column counting from the left to the right. In total there are 45 segments. It should be noted that the center of the area of the light receiving surface lies at the segment SPC35 which is hereinafter referred to as the segment "SPCM", for this is used solely when the photosensor operates in the spot metering mode.

Figure 6:
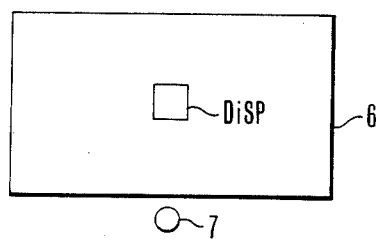
FIG. 6 is a plan view of the view field of the finder of the camera.

FIG. 6 shows the field of view of the finder of the camera. DiSP is an index representing the spot at which the light metering is performed when the AE lock mode is operated and positioned at the center of the area of the viewfield 6 of the finder. This index DiSP is in correspondence relationship to the segment SPCM of FIG. 5, and is printed on a focusing screen or the like. A warning indicator 7 for informing the photographer that the AE lock is automatically released is constructed with a light-emitting diode or a liquid crystal display element.

Figure 2:
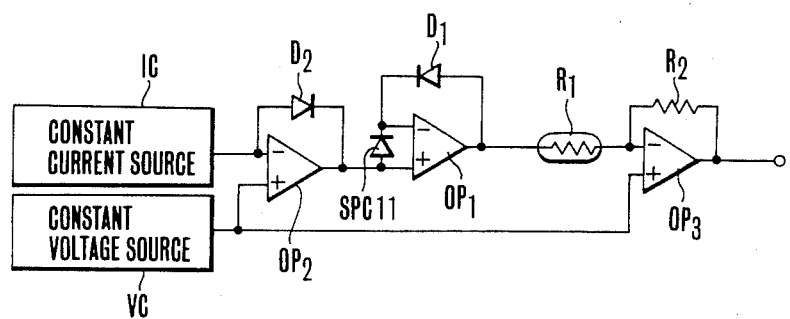
FIG. 2 is an electrical circuit diagram of a practical example of the light metering circuit of FIG. 1.

Referring now to FIG. 1, the circuitry of the camera 1 includes light metering circuits B11 to B59 (B35 is represented by BM), whose details are shown in FIG. 2, for producing outputs proportional to the logarithms of the temperature-compensated outputs of the photosensitive elements SPC11 to SPC59, respectively, and analog switches S11 to S59 (S35 is represented by SM) arranged, upon application of a signal of high level from a ring counter 8 thereto, to turn on, and upon application of a signal of low level to turn off. The ring counter 8 has 45 output stages O11 to O59 (O35 is represented by OM) which produce signals of high level one at a time sequentially from right to left with a prescribed period. After the signal of high level has been produced from the output stage O59, it starts again from the first output stage O11 in sequence. An AE lock switch 9 is arranged to turn on when the AE lock button 5 of FIG. 4 is pushed down and is connected through a pull-up resistor 10 to a voltage source. A capacitor 12 is connected through an analog switch 11 to the output of the light metering circuit BM. An operational amplifier 13 follows up the voltage stored on the capacitor 12, producing an output signal in the form of a voltage $V_{AELK}$. A constant voltage source 14 produces a constant voltage $V_{REF}$. An adder 15 comprises four resistors 16 to 19 of the same resistance value and an operational amplifier 20, and produces an output signal in the form of a voltage: $-(V_{AELK}+V_{REF})$. An inversion amplifier circuit 21 comprises two resistors 22 and 42 of the same resistance value and an operational amplifier 23 inverts the sign of the voltage produced from the adder circuit 15, producing an output signal in the form of the voltage: $(V_{AELK}+V_{REF})$. A subtraction circuit 24 comprises four resistors 25 to 28 and an operational amplifier 29 and produces an output signal in the form of a voltage: $(V_{AELK}-V_{REF})$.

A first comparator 30 has an invertion input terminal to which the voltage ($V_{AELK}+V_{REF}$) is applied, and a non-inversion terminal to which each signal voltage $V_S$ from the aforesaid analog switches S11 to S59 is applied. When the level of any of the signal voltages $V_S$ is higher than the level of the signal voltage ($V_{AELK}+V_{REF}$), a signal of high level is produced. A second comparator 31 has a non-inversion input terminal to which the voltage ($V_{AELK}-V_{REF}$) is applied and an inversion input terminal to which each signal voltage $V_S$ is applied. When the level of any of the signal voltages $V_S$ is lower than the signal voltage ($V_{AELK}-V_{REF}$), a signal of high level is produced. When both comparators 30 and 31 produce the output signals of low level, in other words, when any of the signal voltages $V_S$ falls within a range of signal voltages between ($V_{AELK}+V_{REF}$) and ($V_{AELK}-V_{REF}$), a NOR gate 32 produces an output signal of high level. When any of the signal voltages $V_S$ fall outside the range, because one of the comparators 30 and 31 produces the output signal of high level, the NOR gate 32 produces an output signal of low level. 33 is an OR gate. A timer counter 34 starts to count when the signal of low level is applied to an input terminal R thereof, and produces a signal of high level at an output terminal Q thereof in a prescribed time. This signal of high level endures till the signal of high level is again the input terminal R. A display drive circuit 35 responsive to the signal of high level from the timer counter 34 turns on the lamp 7 of FIG. 6. 36 is an OR gate; 37 is an inverter. Analog switches 38 and 39 turn on when a signal of high level is applied thereto. A light metering computation circuit 40 averages all the output signals of the light metering circuits B11 to B59 and produces an output representing the analog computation result which is applied to the analog switch 39. Based on the light value given through either one of the analog switches 38 and 39, an aperture-shutter time control circuit 41 controls the shutter speed and the size of diaphragm aperture to make a proper exposure for the film being used (not shown).

FIG. 2 shows the circuit structure of the light metering circuits B11 to B59 shown in FIG. 1. It should be noted that since all the light metering circuits B11 to B59 are of the same circuit structure, explanation is made herein taking as an example the light metering circuit B11. D1 is a logarithmic compression diode; D2 is a temperature compensation diode; OP1–OP3 are operational amplifiers; VC is a constant voltage source giving a bias voltage to the non-inversion input terminals of the aforesaid operational amplifiers OP2 and OP3. IC is a constant current source; R1 is a posistor; R2 is a resistor.

Figure 3:
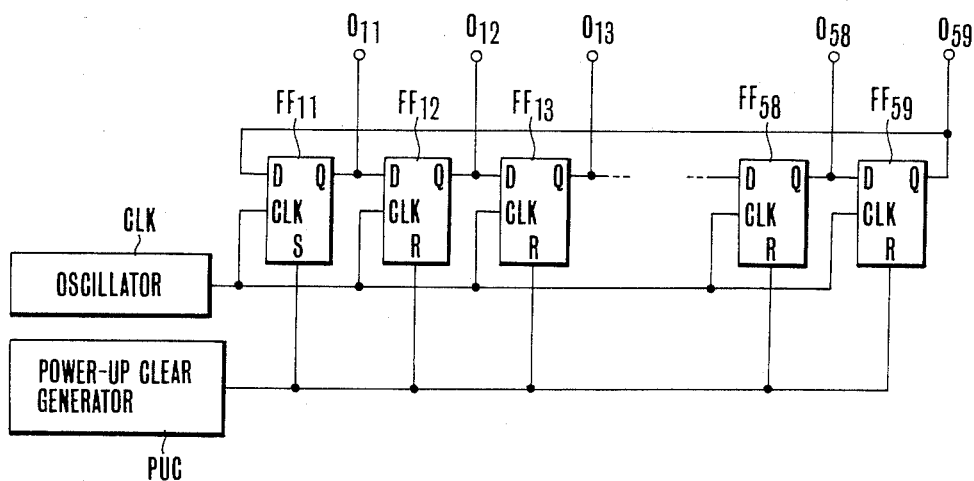
FIG. 3 is an electrical circuit diagram of a practical example of the ring counter of FIG. 1.

FIG. 3 shows the circuit structure of the ring counter 8 shown in FIG. 1. CLK is an oscillator for producing a train of pulses with a prescribed frequency; PUC is a power-up clear generator responsive to throwing of the battery for producing a signal of high level for a short time; FF11 to FF59 are D type flip-flops When the pulse from the power-up clear generator PUC is applied to all the flip-flops FF11 to FF59, the first flip-flop FF11 only changes its output Q to high level. Then, when the first pulse from the oscillator CLK is applied, the output of the flip-flop FF11 is changed to low level, and the output of the second flip-flop FF12 is changed to high level. After that, each time the oscillator CLK produces one pulse, the signal of high level is shifted in sequence: FF13→FF14→. . . FF59.

The operation of the camera is as follows: At first let us explain about the normal mode. When the battery power is applied to the camera 1, all the segments SPC11 to SPC59 of the photosensor SPC produce photocurrents representing the brightnesses of the corresponding portions of a scene to be photographed. Taking an example of the light metering circuit B11, how to process these photocurrents is explained below with reference to FIG. 2. The photocurrent from the element SPC11 is logarithmically compressed by the operational amplifier OP1 with the diode D1. Since, at this time, the output of the temperature compensation circuit of the constant current source IC, diode D2 and operational amplifier OP2 is being applied to the non-inversion input terminal of the operational amplifier OP1, the backward saturation currents of the diodes D1 and D2 of the same characteristic are cancelled. Therefore, the output of the operational amplifier OP1 becomes proportional to the logarithm of the brightness of the portion of the scene and also to the absolute temperature. This output is then computed by the posistor R1, resistor R2 and operational amplifier OP3 to obtain the logarithmically compressed value of object brightness which is independent of the temperature. The output of the light metering circuit B11 then goes to the next stage of the analog switch S11 and the light metering computation circuit 40. As for the other light metering circuits B12 to B59, the same holds.

Meanwhile, since, in this case, the AE lock button 5 is not pushed down, for, as the AE lock switch 9 is OFF, the signal at one of the inputs of the OR gate 36 is high level, that OR gate 36 produces an output signal of high level, thereby the analog switch 39 is turned on. For note, the analog switch 38 remains off because the signal of low level is applied thereto through the inverter 37. Such selection of the analog switch 39 to turn on implies that the average metering mode is operated so that the output of the light metering computation circuit 40, which represents the mean value of the outputs of all the segments of the photosensor, is applied to the aperture-shutter time control circuit 41. If, at this time, the photographer pushes down the release button 3, the size of diaphragm aperture and the speed of the shutter are controlled in accordance with the output of the aperture-shutter time control circuit 41 to make the exposure proper for the entire area of the image format.

Next explanation is given to the AE lock photography. In this case, the photographer while looking through the finder will first put an image of the subject of principal interest in coincidence with the spot DiSP corresponding to the central segment SPCM, and then push down the AE lock button 5. Such depression of the AE lock button 5 causes the AE lock switch 9 to turn on which, in turn, causes the analog switch 11 to turn off. As a result, in a similar manner to that described above, the brightness of the subject is measured by the circuit BM. The output of the light metering circuit BM is memorized in the form of a voltage stored on the capacitor 12. Responsive to this, the operational amplifier 13 produces an output signal or voltage $V_{AELK}$ which is then applied to the adder circuit 15, where the signal voltage $V_{AELK}$ is added to the constant voltage $V_{REF}$ supplied from the constant voltage source 14, and the sum is taken as negative. In the next stage of the inversion amplifier 21, the sign is then changed to positive in amplification. Therefore, the inversion input of the comparator 30 has a value: ($V_{AELK}+V_{REF}$). Meanwhile, the aforesaid signal voltage $V_{AELK}$ is also given to the subtraction circuit 24 where it is subtracted by the constant voltage $V_{REF}$ to obtain the signal voltage ($V_{AELK} - V_{REF}$). The next stage or comparator 31 has a non-inversion input of this value. As the analog switches S11 to S59 are successively turned on in response to a series of outputs O11 to O59 of high level from the ring counter 8, all the output signals or voltages $V_S$ from the light metering circuits B11 to B59 serially enter both the non-inversion input terminal of the first comparator 30 and the inversion input terminal of the second comparator 31. Therefore, if all the signal voltages $V_S$ are higher than the lower limit or ($V_{AELK} - V_{REF}$) and lower than the upper limit or ($V_{AELK} + V_{REF}$), in other words, fall within the range of the light value ($V_{AELK}$) occurring at the time of the AE lock actuation±a value ($V_{REF}$), the output of the NOR gate 32 takes a high level. Because this output is applied through the OR gate 33 to the input terminal R of the timer counter 34, said timer counter 34 is reset, producing an output signal of low level at the output terminal Q thereof. Also, as has been described above, the aforesaid counter 34 changes its output Q to high level at the termination of the counting operation for the prescribed period beginning with the time at which the signal of low level has entered the input terminal R. If the signal at the input terminal R changes to high level before the prescribed period of the counting operation expires, the counter 34 is reset. Hence, only in case when the signal at the input terminal R of the counter 34 takes low level for a longer time than the aforesaid period, the output Q of the counter 34 can change to high level. This period is determined to be slightly longer than the time necessary to complete one cycle of operation of the ring counter 8 in which the photo signals from the segments SPC11 to SPC59 after having been processed by the light metering circuits B11 to B59 are all read out through the switches S11 to S59. As a result, a photographic situation that allows at least one of the light metering circuits B11 to B59 to produce the output falling within the abovedefined range of ($V_{AELK} \pm V_{REF}$) does not change the output Q of the counter 34 to high level.

With the signal of low level from the timer counter 34, as the output of the OR gate 36 becomes the signal of low level, the analog switch 39 turns off and the analog switch 38, because its being supplied with the signal of high level from the inverter 37, turns on, thereby the output of the operational amplifier 13, or the signal voltage $V_{AELK}$ is selected for application to the aperture-shutter time control circuit 41. Then, when the photographer pushes down the release button 3, the size of diaphragm aperture and the shutter speed are controlled in accordance with the brightness information that was obtained from the light metering circuit BM at the time of actuation of the AE lock. The foregoing is the sequence of operations of the AE lock mode when the photographic situation is normal.

For an abnormal situation where the intensity of ambient light changes largely after the AE lock has been made, because any of the signal voltages $V_S$ at the outputs of the light metering circuit B11 to B59 does not fall within the range of voltages ($V_{ALK} \pm V_{REF}$), either one of the comparators 30 and 31 produces an output signal of high level. Therefore, the output of the NOR gate 32 is maintained at low level so long that the timer counter 34 is not reset. Then when the output Q of the counter 34 changes to high level, because the signal of low level is applied to the analog switch 38 through the OR gate 36 and the inverter 37, the AE lock is released. Also, the display drive circuit 35 is rendered operative, thereby the indicator 7 is lighted on, informing the photographer that though the AE lock was made, because the brightness of the subject has changed largely, the camera is released from the AE locking automatically.

Also, the signal of high level from the counter 34 is applied through the OR gate 36 to the analog switch 39, thereby the analog switch 39 is turned on. Therefore, the signal from the light metering computation circuit 40 is selected to be applied to the aperture-shutter time control circuit 41. Then when the release button 3 is pushed down, the size of diaphragm aperture and the shutter speed are controlled in accordance with the average brightness of the scene, similarly to the case when the AE lock is not made.

According to the embodiment of the invention, when it happens that, as the ambient light intensity changes rapidly to large extent, the light value measured just before the start of an exposure deos not coincide with, or fall within the range between the limits determined by, that measured at the time of actuation of the AE lock, the camera is automatically switched from the AE lock mode to the normal mode. And, the photographer is warned of this. Thus, it is made possible to avoid the making of improper exposure of the subject of principal interest due to the change of the brightness thereof after the actuation of the AE lock.

Many variations of the illustrated embodiment of the invention are possible. For example, while, in the illustrated embodiment, the average light metering aspect that takes place when the camera is not manually switched to the normal mode after the AE lock has automatically been released, has the same weight on each of the outputs of the individual photosensitive elements SPC11 to SPC59, different weights may be given to them, depending on the their positions. That is, the so-called evaluation-differentiated light metering may be permitted to take place. It is, of course, possible, that even in the normal mode such light metering is selectively operated. Further, though the camera is automatically switched from the AE lock mode to the normal mode when the light value at the time of actuation of the AE lock does not coincide with that at the time of the exposure, it is to be understood that a modification may be made that the camera is left unchanged from the AE lock mode, but the photographer is merely warned of this in a manner similar to that described above. Also, the warning means for such a case is not confined to the form of light by the indicator 7. For example, a buzzer may be made use of.

Also, instead of using the photosensor SPC having a large number of segments SPC11 to SPC59, it is possible to reduce the number of photosensitive elements to one at the central portion of the area of the image frame together with one or two at each side thereof. Further, only one portion may be measured.

Also, though, in the embodiment, the segment at the center of the area of the image frame is used for the AE lock mode, some other segment or segments may be used when in the AE lock mode.

As has been described above, according to the present invention, the camera having the AE lock function is provided with discriminating means for testing whether the difference between the brightness level stored in AE information memory means and the brightness level obtained just before the start of an exposure falls within a prescribed range or not, and processing means responsive to detection of the fact that it falls outside the range for automatically releasing the camera from the AE locking, and producing a warning signal, thereby giving an advantage that a larger change of the brightness of the subject of principal interest than the prescribed threshold can be taken into account in order to insure that an improper exposure to the subject can be avoided as the camera is prohibited from shooting, or as the photographer is obligated to renew the actuation of the AE lock.

What is claimed is:

1. A camera in which information representing brightness from a light metering circuit is memorized when an AE lock is actuated, and the exposure is controlled in accordance with said memorized brightness, comprising:
   (a) detecting means for detecting information corresponding to the brightness from said light metering circuit upon change of said detected information corresponding to the brightness from the memorized value at the time of actuation of the AE lock by more than a prescribed value to produce an output; and
   (b) indicating means responsive to the output of said detecting means for producing a warning indication.

2. A camera in which information representing brightness from a light metering circuit is memorized when an AE lock is actuated, and the exposure is controlled in accordance with said memorized brightness, comprising:
   (a) detecting means for detecting information corresponding to the brightness from said light metering circuit upon change of said detected information corresponding to the brightness from the memorized value at the time of actuation of the AE lock by more than a prescribed value to produce an output; and
   (b) a reset circuit responsive to the output of said detecting means for cancelling the AE lock mode.

3. A camera according to claim 2, wherein said reset circuit prohibits the exposure from being controlled based on said memorized value in response to the output of said detecting means.

4. A camera according to claim 2, wherein said camera has an exposure control circuit arranged upon actuation of a camera release after the actuation of the AE lock to initiate an exposure control, and said reset circuit in response to the output of said detecting means prohibits said exposure control circuit from making an exposure control based on said memorized value, and instead allows it to make an exposure control based on that output of said light metering circuit which occurs after the actuation of the AE lock.

5. A camera according to claim 1 or 2, wherein said light metering circuit has a plurality of light receiving portions, and the output of a particular one of said light receiving portions is memorized when an AE lock is actuated.

6. A camera according to claim 5, wherein said detecting means detects the output of each of said light receiving portions, and produces an output when all the outputs of said light receiving portions have changed from the memorized value by more than a prescribed value.

7. A camera in which a signal from a photographic information forming circuit for producing a corresponding signal to a given photographic situation is memorized by a manual operation before the actuation of a camera release, and the photographic operation is controlled based on said memorized value, including:
   (a) detecting means for detecting the signal from said information forming circuit upon change of the detected signal from the memorized value at the time of the manual operation by more than a prescribed value to produce an output; and
   (b) indicating means responsive to the output of said detecting means for producing a warning indication.

8. A camera in which a signal from a photographic information circuit for producing a corresponding signal to a given photographic situation is memorized by a manual operation before actuation of a camera release, and the photographic operation is controlled based on said memorized value, including:
   (a) detecting means for detecting the signal from said information forming circuit upon change of the detected signal from the memorized value at the time of the manual operation by more than a prescribed value to produce an output; and
   (b) a control circuit including a selecting circuit which selects an output of said information forming circuit when it is detected that a signal from said information forming circuit changes by more than said prescribed value with respect to the memorized value, and selects the memorized value when a change more than the prescribed value is not detected, said control circuit controlling the photographic operation on the basis of the selected memorized value or the selected output of said information forming circuit.

* * * * *